US005894650A

United States Patent [19]

Barenburg

[11] Patent Number: 5,894,650

[45] Date of Patent: Apr. 20, 1999

[54] UNIVERSAL GEAR PULLER

[75] Inventor: Daniel Barenburg, Middletown, N.Y.

[73] Assignee: Christina Louiza Barenburg, Middletown, N.Y.

[21] Appl. No.: 08/869,614

[22] Filed: Jun. 5, 1997

[51] Int. Cl.[6] .......... B23P 19/04

[52] U.S. Cl. .......... 29/259

[58] Field of Search .......... 29/258–263

[56] References Cited

U.S. PATENT DOCUMENTS

| | | | |
|---|---|---|---|
| 1,891,869 | 12/1932 | Cox | 29/261 |
| 1,986,588 | 1/1935 | Manning et al. | 29/261 |
| 2,024,891 | 12/1935 | Spuler et al. | 29/261 |
| 3,689,978 | 9/1972 | Kelso | 29/259 |
| 5,224,254 | 7/1993 | McPeak et al. | 29/261 |

*Primary Examiner*—Robert C. Watson
*Attorney, Agent, or Firm*—Kenneth E. Macklin; Milde, Hoffberg & Macklin, LLP

[57] ABSTRACT

A universal gear puller that comprises:

(a) a cylindrical hub having a central longitudinal hole therethrough, said hole being threaded;

(b) a set of three rings, each of which is placed on the cylindrical hub and is at least partly rotatable about the cylindrical hub, said rings being maintained in position on the cylindrical hub by retaining means at the top and bottom of the cylindrical hub, each ring having a pair of parallel members attached to and extending away from the side of said ring, each pair of parallel members having a space therebetween that may be aligned with the threaded holes near the periphery of the exposed end surface of the gear while the central threaded hole in the cylindrical hub is aligned with the threaded hole in the shaft to which the gear is ordinarily bolted;

(c) a thrust bolt screwed into said central threaded hole in the cylindrical hub; and (d) a non-threaded means that is long enough to extend to the bottom of the threaded hole in the shaft onto which the gear is ordinarily bolted and that is used to transfer the force from the thrust bolt when it is turned to apply force in order to pull the gear.

16 Claims, 3 Drawing Sheets

UNIVERSAL GEAR PULLER

BACKGROUND OF THE INVENTION

The present invention relates to a novel universal gear puller, particularly useful for pulling the crank gears from the crankshafts of Chrysler 2.2 and 2.5 liter engines and similarly configured crank gears.

There are crank gear pullers on the market that allow a mechanic to pull a crank gear without damaging it so that it can be reused. These crank gear pullers generally have slots in their nonflexible mounting plates so that the plate of the crank gear puller can be used on a variety of crank gears by putting the mounting bolts in the slots at the position of the mounting holes in the crank gear that are exposed when the pulley that is normally attached to the crank gear is removed. There are crank gear pullers that have two slots longitudinally aligned on either side of the central thrust bolt that is tightened in order to remove the crank gear. There are also crank gear pullers that have three slots generally aligned in a Y-configuration. However, none of these crank gear pullers can be used to pull the crank gears on Chrysler 2.2 and 2.5 liter engines and similarly configured crank gears, having 5 mounting bolts for the pulley. If one can mount one of these prior art crank gear pullers on such a crank gear, the central thrust bolt is not centrally aligned with the crank shaft, and therefore cannot be used to pull the crank gear.

Because of the configuration of the Chrysler 2.2 and 2.5 liter engine block surrounding the crank gear and the minute clearance between the back of the crank gear and the engine block, it is not possible to use a claw-type gear puller, where the claw would grab the back of the crank gear and hold it while the thrust bolt is turned in order to extract the crank gear.

Prior to the invention of the novel universal tool of the invention, whenever an auto mechanic had to remove the crank gear on a Chrysler 2.2 or 2.5 liter engine to get at the oil seal, he had to drill and cut the gear—a job that took about an hour, was very difficult and aggravating, and resulted in the destruction of the gear. There was no tool readily available to the average mechanic that would allow him to remove the gear intact in a lesser period of time.

The universal tool of the invention may be used as a crank gear puller that enables the mechanic to remove the gear intact within a very short 5 minute time period, thus saving both the crank gear and almost an hour of the mechanic's time.

SUMMARY OF THE INVENTION

It is an object of the present invention to provide a universal gear puller that allows the mechanic to remove virtually any gear intact, particularly those on motor vehicles.

It is an object of the present invention to provide a universal gear puller that allows a mechanic to economize and just buy one gear puller, rather than the several that are currently required to accomplish what the universal gear puller of the invention does.

It is an object of the present invention to provide a universal gear puller that fulfills a long-felt need of mechanics.

It is an object of the present invention to provide a crank gear puller that does not require the tedious cutting of the crank gear to remove it.

It is an object of the present invention to provide a crank gear puller that allows a mechanic to remove a crank gear intact.

Yet another object of this invention is to provide a crank gear puller that does not damage the threads in the end of the crankshaft onto which the crank gear is attached.

It is an object of the present invention to provide a crank gear puller that saves the mechanic time in removing a crank gear.

It is a still further object of this invention to provide a crank gear puller with a simple and effective means to prevent the crank gear puller and therefore the crank gear and in turn the crankshaft from turning when the thrust bolt is being turned, particularly with a pneumatic impact wrench.

These objects, as well as further objects which will become apparent from the discussion that follows, are achieved, in accordance with the present invention, by a universal gear puller that comprises:

(a) a cylindrical hub having a central longitudinal hole therethrough, said hole being threaded;

(b) a set of three rings, each of which is placed on the cylindrical hub and is at least partly rotatable about the cylindrical hub, said rings being maintained in position on the cylindrical hub by retaining means at the top and bottom of the cylindrical hub, each ring having a pair of parallel members attached to and extending away from the side of said ring, each pair of parallel members having a space therebetween that may be aligned with the threaded holes near the periphery of the exposed end surface of the gear while the central threaded hole in the cylindrical hub is aligned with the threaded hole in the shaft to which the gear is ordinarily bolted;

(c) a thrust bolt screwed into said central threaded hole in the cylindrical hub; and (d) a non-threaded means that is long enough to extend to the bottom of the threaded hole in the shaft onto which the gear is ordinarily bolted and that is used to transfer the force from the thrust bolt when it is turned to apply force in order to pull the gear.

PREFERRED EMBODIMENTS OF THE INVENTION

Figure 1:
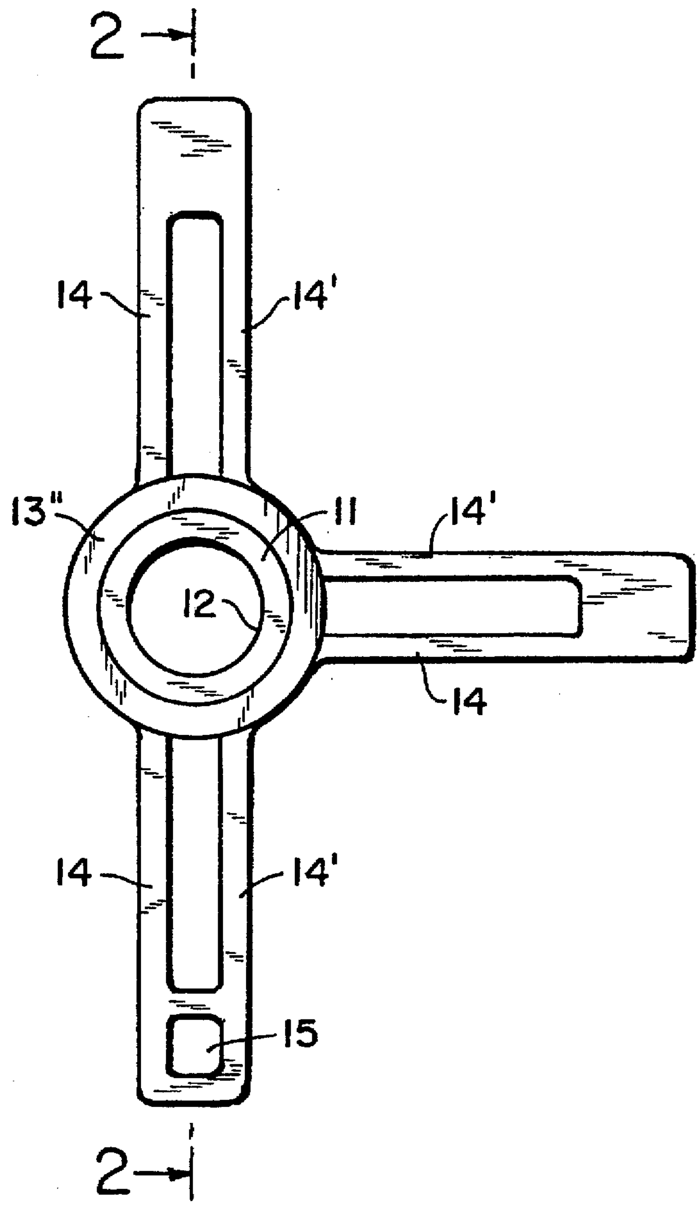
FIG. 1 is a top view of a subassembly of the universal gear puller of the invention, comprising a central hub and a set of three rings each of which has a pair of parallel members extending therefrom.
Figure 2:
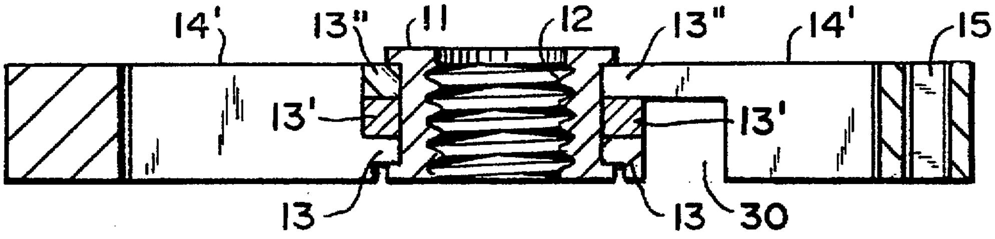
FIG. 2 is a cross-section view taken along the line 2—2 of the subassembly of the universal gear puller of the invention shown in FIG. 1.
Figure 3:
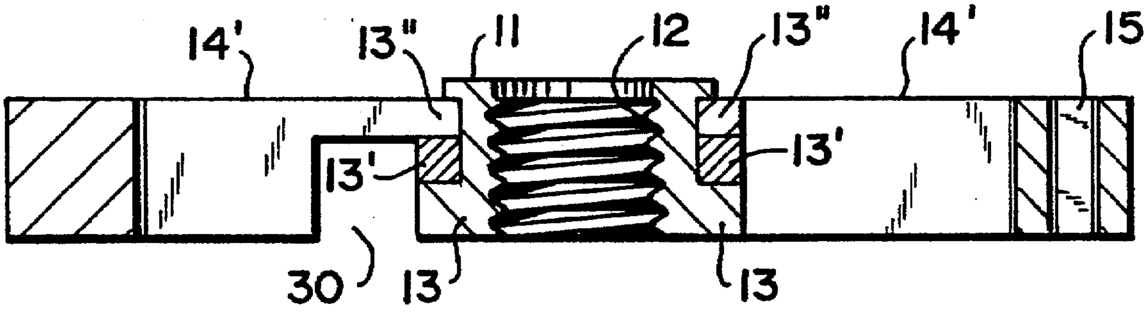
FIG. 3 is a cross-section view taken along the line 2—2 of an alternative subassembly of the universal gear puller of the invention shown in FIG. 1.
Figure 4:
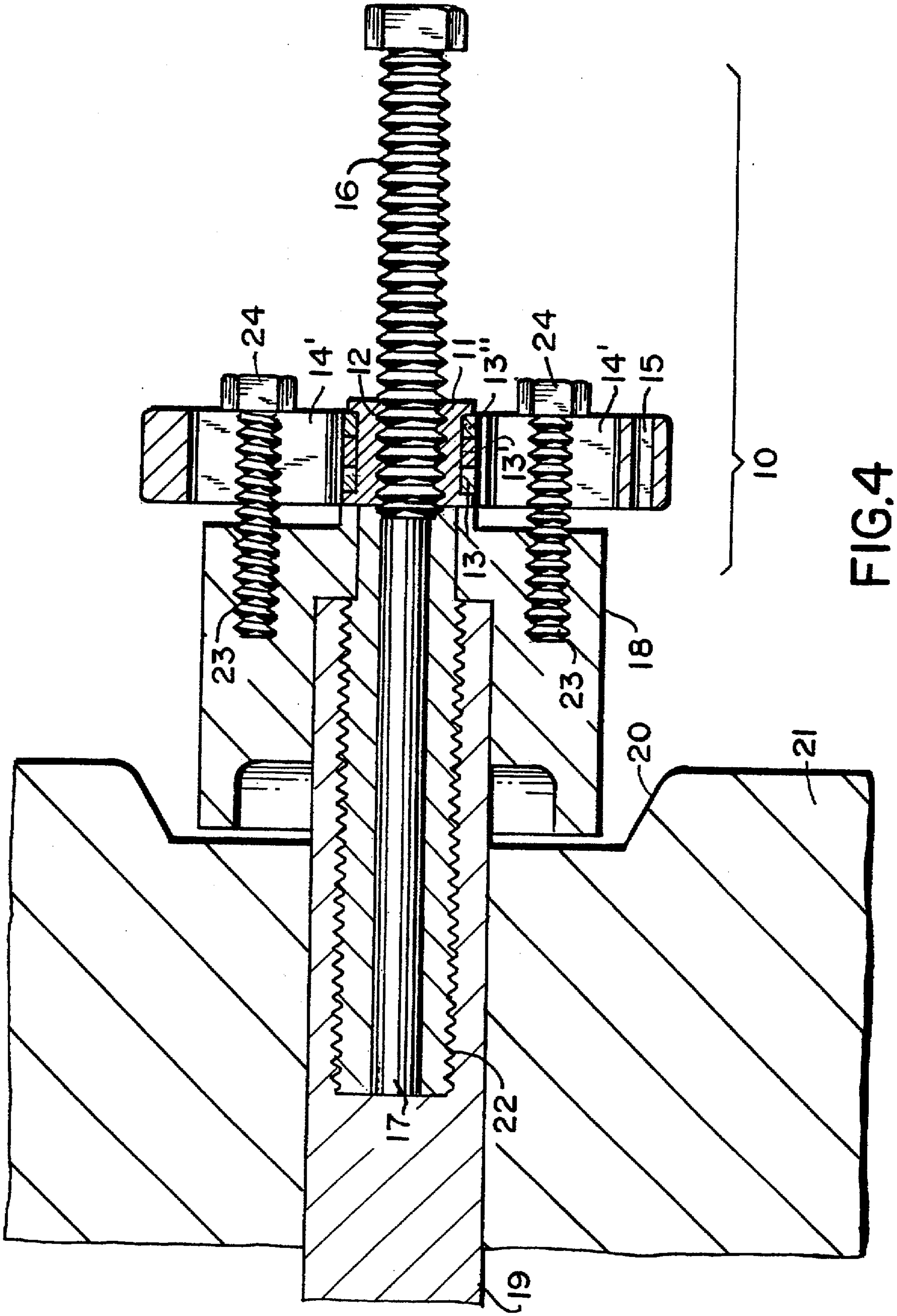
FIG. 4 is a cross-section view of the universal gear puller of the invention shown with a crank gear and the crankshaft onto which it is ordinarily attached.

FIGS. 1, 2 and 3 illustrate a subassembly of the universal gear puller 10 of the invention. As shown in FIG. 4, the gear puller 10 of the invention comprises: (a) a central hub 11, having threads 12; (b) a set of three rings 13, 13' and 13" each of which is placed on the central hub 11 and from the side of each of which a pair of parallel members 14 and 14' extend; (c) a thrust bolt 16 and (d) a rod 17. Any convenient dimensions may be used in the construction of the universal gear puller 10 of the invention as long as the dimensions are large enough to result in a gear puller that fits the mounting bolt positions and the size of the mounting bolts and is sturdy enough to withstand the forces exerted upon the gear puller in use. Convenient dimensions are about 6 to 7" in overall length for the gear puller 10; about ¾ to 1" in height and diameter for the cylindrical hub 11; and a minimum of about ⅛" in thickness for rings 13, 13' and 13", about ⅜" space between parallel members 14 and 14', about 3" in length and ⅜" in diameter for thrust bolt 16 and about 3½" in length and ¼" in diameter for rod 17.

FIG. 1 is a top view of a subassembly of the universal gear puller 10 of the invention, comprising a central hub 11, which has a threaded hole 12, and a set of three rings 13, 13' and 13" (only the top one of which 13" is visible in this view), each of which rings 13, 13' and 13" is placed on the central hub 11 and has a pair of parallel members 14 and 14' extending therefrom. Each pair of parallel members 14 and 14' is shown joined at their outer ends. This may be convenient when the rings 13, 13' and 13" are cast in one piece with the pairs of arms 14 and 14'. However, when the similar pieces are machined, it may be desirable for their outer ends not to be joined. Also shown is an optional square hole 15 suitable for accepting the square drive of a socket wrench handle. Preferably, the square hole 15 is ⅜" or ½".

FIG. 2 is a cross-section view of the subassembly of the universal gear puller 10 of the invention shown in FIG. 1, wherein the reference numerals are as defined in connection with FIG. 1 in the preceding paragraph. Notch 30 in parallel members 14 and 14' which extend from top ring 13" allows two sets of the parallel members 14 and 14' to be more closely positioned in an acute angle sometimes required for bolt holes around the periphery of a gear to be removed. A similar notch 30 may also be present in the parallel members 14 and 14' that extend from the middle ring 13'. The top and bottom of the cylindrical hub 11 have means to retain the rings in position on the cylindrical hub. These are shown in FIGS. 2 and 3 as unnumbered outward protrusions at the top and bottom of the cylindrical hub 11. Preferably, the surfaces of the cylindrical hub 11, ring 13 and the parallel members 14 and 14' of the gear puller that are in contact with or in closest proximity to the gear are all in essentially the same plane.

FIG. 3 is a cross-section view of a particularly preferred subassembly of the universal gear puller 10 of the invention shown in FIG. 1, wherein the reference numerals are as defined in connection with FIGS. 1 and 2 above. However, the cylindrical hub 11 and the bottom ring 13 are joined togther, thereby obviating the need for a separate bottom retaining means.

FIG. 4 is a cross-section view of the universal gear puller 10 of the invention shown with a crank gear 18 and the crankshaft 19 onto which it is ordinarily attached. Also indicated is the recess 20 in the engine block 21 of a Chrysler 2.2 or 2.5 liter engine in which the crank gear 18 rests and which makes it difficult to gain access to the crank gear 18 in order to pull it or pry it out. The remaining reference numerals are as described above.

To use the crank gear puller 10, one first puts rod 17 in the threaded hole 22 in crankshaft 19. One then mounts the subassembly depicted in FIG. 1 on the crank gear 18 by first positioning each of the rotatable rings 13, 13' and 13" to align the slots formed by each pair of parallel members 14 and 14' with one of the threaded mounting holes 23. Then one inserts bolts 24 through the slots formed by each pair of parallel members 14 and 14' into the threaded mounting holes 23 and screws in bolts 24 into the threaded mounting holes 23 in crank gear 18, which are ordinarily used to mount a pulley on the crank gear 18. One then screws the thrust bolt 16 into threaded cylindrical hub 11 until the force transmitted from the thrust bolt 16 to rod 17 and to the bottom of the threaded hole 22 in crankshaft 19 generates a reactive force sufficient to pull the crank gear 18 from the end of crankshaft 19.

The subassembly of the crank gear puller 10 of the invention depicted in FIGS. 1, 2 and 3 may be made of any rigid metal that is thick and strong enough to withstand service. Preferably, the subassembly is made of steel, particularly hardened steel.

The mounting slots formed by pairs of members 14 and 14' may be positioned to correspond to three of the five threaded mounting holes in the crank gear 18 for a Chrysler 2.2 and 2.5 liter engine. In some situations where the mounting holes are positioned at 180° relative to the shaft on which a gear is placed, it is advisable to use only 2 of the 3 pairs of members 14 and 14'.

Preferably, the non-threaded means that is long enough to extend to the bottom of the threaded hole 22 in the crankshaft 19 is a metal rod 17 that is narrower than the threaded hole 22 in the crankshaft 19. However, it might instead be a non-threaded section on the bottom of the thrust bolt 16 which is narrower than the threaded hole 22 in the crankshaft 19. The reason for the non-threaded means that is narrower than the threaded hole 22 in the end of the crankshaft 19 is to minimize or eliminate any damage to the threads in the threaded hole 22 in the crankshaft 19.

Preferably, there is provided on the crank gear puller 10 a means for preventing the crank gear 18 from turning the crankshaft 19 when torque is applied to the thrust bolt 16 as it is turned to apply force in order to remove the crank gear 18. Damage to the engine 21 can occur if the crankshaft 19 is turned with the crank gear puller 10. The means for preventing the crank gear 18 from turning the crankshaft 19 when torque is applied to the thrust bolt 16 is preferably a square hole 15 in one of the ends joining a pair of members 14 and 14' of the crank gear puller 10, into which the square drive of a socket wrench handle may be inserted. The user may hold onto the handle and prevent the crank gear 18 from turning the crankshaft 19 when torque is applied to the thrust bolt 16 as it is turned to apply force in order to remove the crank gear 18.

Torque may be applied to the thrust bolt 16 by any convenient means, e.g., a crescent wrench, an open end wrench, a box wrench, or a socket wrench. However, for speed, a pneumatic impact wrench is preferred.

The foregoing specification and drawings have thus described and illustrated a novel universal device for pulling gears from shafts, particularly crank gears on crankshafts of Chrysler 2.2 and 2.5 liter engines and similarly configured engines, which fulfills all the objects and advantages sought therefor. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

What is claimed is:

1. A universal gear puller that comprises:

(a) a cylindrical hub having a central longitudinal hole therethrough, said hole being threaded;

(b) a set of three rings, each of which is placed on the cylindrical hub and is at least partly rotatable about the cylindrical hub, said rings being maintained in position on the cylindrical hub by retaining means at the top and bottom of the cylindrical hub, each ring having a pair of parallel members attached to and extending away from the side of said ring, each pair of parallel members having a space therebetween that may be aligned with the threaded holes near the periphery of the exposed end surface of the gear while the central threaded hole in the cylindrical hub is aligned with the threaded hole in the shaft to which the gear is ordinarily bolted;

(c) a thrust bolt screwed into said central threaded hole in the cylindrical hub; and (d) a non-threaded means that is long enough to extend to the bottom of the threaded hole in the shaft onto which the gear is ordinarily bolted and that is used to transfer the force from the thrust bolt when it is turned to apply force in order to pull the gear.

2. The gear puller as claimed in claim 1, wherein the universal gear puller is made of steel.

3. The gear puller as claimed in claim 1, wherein the non-threaded means that is long enough to extend to the bottom of the threaded hole in the shaft is a metal rod.

4. The gear puller as claimed in claim 1, wherein the non-threaded means that is long enough to extend to the bottom of the threaded hole in the shaft is a non-threaded section on the bottom of the thrust bolt which is narrower than the threaded hole in the shaft.

5. The gear puller as claimed in claim 1, wherein there is a means for preventing the gear from turning the shaft when torque is applied to the thrust bolt as it is turned to apply force in order to remove the gear.

6. The gear puller as claimed in claim 5, wherein the means for preventing the gear from turning the shaft when torque is applied to the thrust bolt is a square hole, into which the square drive of a socket wrench handle may be inserted so that the user may hold onto the handle and prevent the gear from turning the shaft when torque is applied to the thrust bolt as it is turned to apply force in order to remove the gear.

7. The gear puller as claimed in claim 1, wherein the surfaces of the cylindrical hub, ring and members of the gear puller that are in contact with or in closest proximity to the gear are all in essentially the same plane.

8. A universal gear puller that comprises:

(a) a cylindrical hub having a central longitudinal hole therethrough, said hole being threaded;

(b) a set of three rings, each of which is placed on the cylindrical hub, the bottom ring of which is joined to the cylindrical hub and the two other rings are at least partly rotatable about the cylindrical hub, said rings being maintained in position on the cylindrical hub by retaining means at the top of the cylindrical hub, each ring having a pair of parallel members attached to and extending away from the side of said ring, each pair of parallel members having a space therebetween that may be aligned with the threaded holes near the periphery of the exposed end surface of the gear while the central threaded hole in the cylindrical hub is aligned with the threaded hole in the shaft to which the gear is ordinarily bolted;

(c) a thrust bolt screwed into said central threaded hole in the cylindrical hub; and (d) a non-threaded means that is long enough to extend to the bottom of the threaded hole in the shaft onto which the gear is ordinarily bolted and that is used to transfer the force from the thrust bolt when it is turned to apply force in order to pull the gear.

9. A universal crank gear puller that comprises:

(a) a cylindrical hub having a central longitudinal hole therethrough, said hole being threaded;

(b) a set of three rings, each of which is placed on the cylindrical hub and is at least partly rotatable about the cylindrical hub, said rings being maintained in position on the cylindrical hub by retaining means at the top and bottom of the cylindrical hub, each ring having a pair of parallel members attached to and extending away from the side of said ring, each pair of parallel members having a space therebetween that may be aligned with the threaded holes in the crank gear that ordinarily are used to mount a pulley while the central threaded hole in the cylindrical hub is aligned with the threaded hole in the crankshaft to which the crank gear is ordinarily bolted;

(c) a thrust bolt screwed into said central threaded hole in the cylindrical hub; and (d) a non-threaded means that is long enough to extend to the bottom of the threaded hole in the crankshaft onto which the crank gear is ordinarily bolted and that is used to transfer the force from the thrust bolt when it is turned to apply force in order to pull the crank gear.

10. The crank gear puller as claimed in claim 9, wherein the crank gear puller is made of steel.

11. The crank gear puller as claimed in claim 9, wherein the space between each pair of parallel members is aligned to match one of the pulley mounting holes of a crank gear for a Chrysler 2.2 or 2.5 liter engine.

12. The crank gear puller as claimed in claim 9, wherein the non-threaded means that is long enough to extend to the bottom of the threaded hole in the crankshaft is a metal rod.

13. The crank gear puller as claimed in claim 9, wherein the non-threaded means that is long enough to extend to the bottom of the threaded hole in the crankshaft is a non-threaded section on the bottom of the thrust bolt which is narrower than the threaded hole in the crankshaft.

14. The crank gear puller as claimed in claim 9, wherein there is a means for preventing the gear from turning the crankshaft when torque is applied to the thrust bolt as it is turned to apply force in order to remove the gear.

15. The crank gear puller as claimed in claim 14, wherein the means for preventing the gear from turning the crankshaft when torque is applied to the thrust bolt is a square hole, into which the square drive of a socket wrench handle may be inserted so that the user may hold onto the handle and prevent the crank gear from turning the crankshaft when torque is applied to the thrust bolt as it is turned to apply force in order to remove the crank gear.

16. The crank gear puller as claimed in claim 9, wherein the surfaces of the cylindrical hub, ring and members of the gear puller that are in contact with or in closest proximity to the gear are all in essentially the same plane.

* * * * *